J. H. SMITH.
ROTARY PUMP.
APPLICATION FILED OCT. 12, 1916.

1,339,723.

Patented May 11, 1920.
2 SHEETS—SHEET 1.

WITNESSES:
Carl E. Sinclair

INVENTOR.
J. Hunter Smith
BY
J. H. Smith
ATTORNEY.

J. H. SMITH.
ROTARY PUMP.
APPLICATION FILED OCT. 12, 1916.

1,339,723.

Patented May 11, 1920.
2 SHEETS—SHEET 2.

WITNESSES:
Carl E. Sinclair

INVENTOR.
J. Hunter Smith
BY
J. H. Smith
ATTORNEY.

UNITED STATES PATENT OFFICE.

JOSEPH HUNTER SMITH, OF OAKLAND, CALIFORNIA, ASSIGNOR TO WALTER J. PIATT, OF OAKLAND, CALIFORNIA.

ROTARY PUMP.

1,339,723.  Specification of Letters Patent.  Patented May 11, 1920.

Application filed October 12, 1916. Serial No. 125,302.

*To all whom it may concern:*

Be it known that I, JOSEPH HUNTER SMITH, residing at the city of Oakland, county of Alameda, State of California, have invented certain new and useful Improvements in Rotary Pumps, of which the following is a specification.

My invention refers to that class of rotary pumps having a casing, an eccentrically mounted rotor or driver with radially extending arms or blades therein mounted upon an axle.

The object of my invention is:—

To increase the efficiency and durability of the form of pump named in the following particulars:

(*a*) By overcoming all waste and leakage, of water, or other substance pumped, between the blades of the rotor or driver of the pump and the inner periphery of the casing, which is the difficulty encountered in all other pumps of the class at this time.

(*b*) To increase the durability of the pump by the diminishment of all possible strain particularly upon the blades of the pump, caused by direct impact with the water or other substance pumped.

(*c*) To increase the durability of the pump by the elimination of all possible friction.

(*d*) To increase the durability of the pump by reduction of the number of its parts, making each part detachable and replaceable at will in case of necessary repairs.

The greater efficiency of this form of pump is secured by the methods used to control the impacts created by the induction and ejection of the water or other fluid pumped and the regulation of the mechanical and centrifugal movement of the blades while in action and the minimizing of all unnecessary clearances which has never before been adequately accomplished but which the inventor has accomplished by simple and effective mechanical methods as will be shown hereafter.

In other forms of this type of pump this object has been attempted to be accomplished in the following manner:

1. A spring has been mounted within the rotor behind each blade, or other method employed to cause each blade to contact with the periphery of the casing, such contact being relied upon to force the blade into the rotor as same revolves, thus resulting in destructive wear upon the ends of the blades and upon the periphery of the casing.

2. Means have been employed to cause substantially such a radial motion of the blade within the rotor as will result in a close fit between the casing periphery and the blade ends.

3. A cam has also been employed to guide the blades.

But it has been found that such means result either in a multiplicity of complicated parts, or in the blades having such a motion as results in the blade ends departing slightly from the circular periphery of the casing, thereby allowing slippage of the fluid past the blades at certain points and thus greatly reducing the efficiency of the pump, and particularly is this true until the rotor has gained a certain speed.

I avoid the defects in the other forms of rotary pumps and accomplish the objects of my invention by means of the construction illustrated in the accompanying drawings which, therefore, form a part of this application for Letters Patent, and which are hereby referred to and marked Figures 1, 2, 3, 4, 5, 6, 7, 8, 9 and 10;

Figure 1:
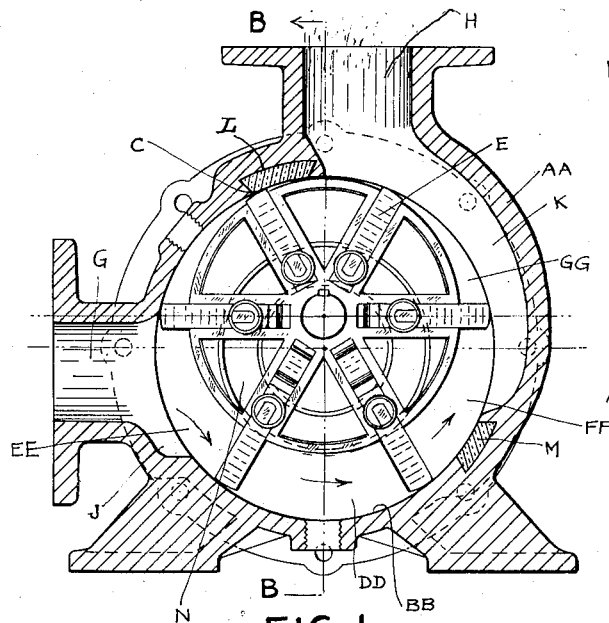
Fig. 1 is a section through line A A of Fig. 2.
Figure 2:
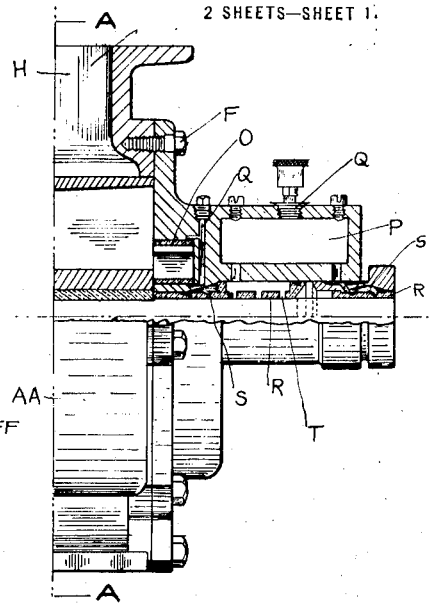
Fig. 2, is a half section and half elevation through line B B of Fig. 1.
Figure 4:
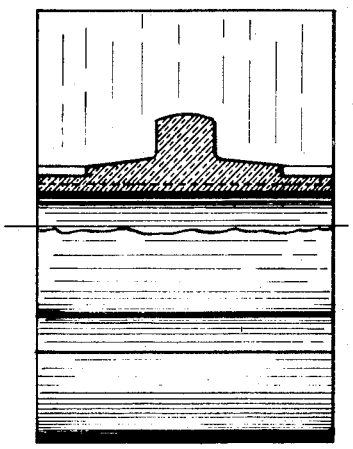
Fig. 4, is a half section and half elevation of the side of driver.
Figure 5:
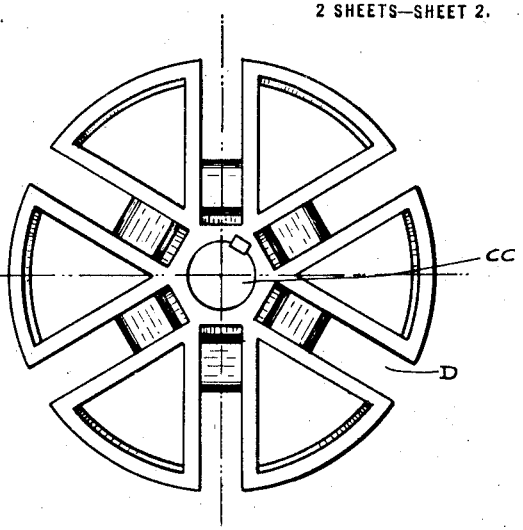
Fig. 5, is an end elevation.

In a pump constructed according to my invention the rotor or driver is of cylindrical form, Figs. 4 and 5, and is revoluble when mounted upon an axle within a casing, centrally relative to its own periphery and eccentrically relative to the casing periphery, Fig. 1, the periphery of the driver and the periphery of the casing coinciding at a point adjacent the discharge orifice 110 letter c, said periphery of said casing being counter bored to the extent of $\frac{1}{32}$ of an inch to fit the peripheral face of said driver at the point of contact of said driver with said casing adjacent to said discharge orifice Fig. 1, letter C, the driver having diametrical slots Fig. 5, letter D, wherein are mounted the blades, Fig. 1, letter E, and the casing being open on both sides according to Fig. 2, but supplied with a side plate for each of these openings which fit into the sides of the casing and are sealed to the casing by bolts as shown on Fig. 2, letter F. The said casing also contains an entrance orifice Fig. 1, letter G and a discharge orifice Fig. 1, letter H, the inner periphery of the casing being a perfect circle, excepting where broken by the by-pass port opposite the entrance orifice Fig. 1, letter J and the discharge orifice Fig. 1, letter K, and excepting also where broken by the counterbore in the inner periphery of the said casing opposite the discharge orifice, said inner periphery of the said casing being counter bored to the extent of $\frac{1}{32}$ of an inch more or less at the place of contact of the rotor with the said casing at said point adjacent to the discharge orifice as shown on Fig. 1, letter C, forming a complete valve between the discharge orifice and the entrance orifice.

Figure 8:
Fig. 8, is an elevation of the blade with a compound ring bearing.

This casing also has two recesses in its inner periphery, one immediately adjacent the discharge orifice, as at L (but past the latter with respect to the direction of rotation of the rotor) and another immediately adjacent the lower or front end of the by pass K, as at M, said recesses being of such shape as to permit a tapered dovetailed insertion to be placed in same so as to completely fill said recess constructed to fit tight, at the same time being easily removable and replaceable in case of wear. At the points L and M, the blades of the rotor contact with great pressure and the inserts L and M are of such nature and material as to take up the pressure and cause a tight seal between the blades and inner periphery of the casing in order to obtain the efficient results aimed at by the invention. On the inner side of each of these side plates is formed an annular groove which is concentric to the inner periphery of the casing. See Fig. 1, letter N. This groove carries an inner and outer ring. See Fig. 2, letter O. In this groove between the rings the trunnions with their bearings with which each blade is provided as shown on Figs. 6 and 8, slide when the driver turns and by this means the outer surface of the blade is kept absolutely true to the inner periphery of the casing at all points and at all times during its action, Fig. 1, letter N. The clearance between the blades and the inner periphery of the casing may be more or less, or made to contact continuously with the inner periphery of the casing while in action. The object of this groove, the trunnion, and rings of the blades is to keep the blade in position mechanically and to retard any action created centrifugally or otherwise, thus doing away with the great waste of power and leakage of water or other substance between the blades and the casing of the pump found in other types of this form of pumps. The rings within this groove have a sufficient clearance to enable them to rotate at will when the trunnion is in contact through pressure, or otherwise making them anti-friction. The side plates also carry the axle of the driver, the bearings for said axle, and the oiling system.

Figure 3:
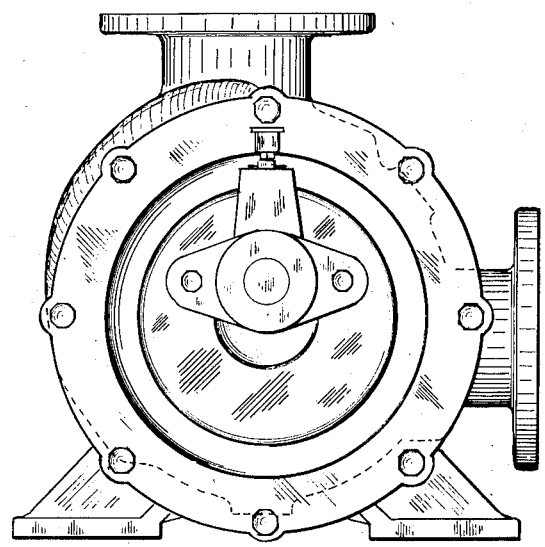
Fig. 3, is an elevation showing exterior of the casing, etc.

Each of said side plates containing an oiling system formed by a projection raised on the top of the axle bearing Figs. 2 and 3, this projection being cored out Fig. 2, letter P, to contain a given quantity of oil or other lubricant and is provided with holes, Fig. 2, letter Q, for oil or grease cups to supply requirements. In this bearing is inserted a bronze sleeve extending from the hub of the driver to a point on the outside of the shaft, Fig. 2, letter R, which is constructed so as to allow for the introduction of a gland, Fig. 2, letter S and necessary packing. The sleeve named is recessed on the back and perforated with small holes penetrating to the shaft, Fig. 2, letter T, to permit the oil or other lubricant to seep through and lubricate the bearing.

Figure 10:
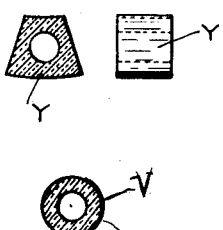
Fig. 10 is an end view of a modified trunnion.
Figure 6:
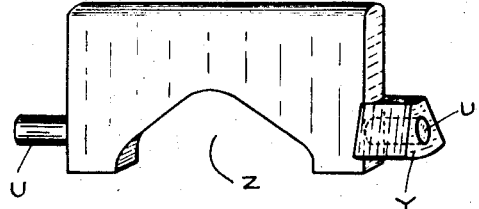
Fig. 6, is an elevation of a blade showing the trunnion and sectional bearing.
Figure 7:
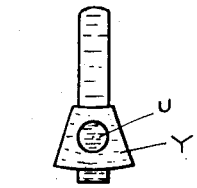
Fig. 7, is an end view of blade with sectional bearing.
Figure 9:
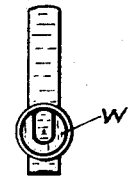
Fig. 9, is the end elevation of the blade with a compound bearing.

The blades of the pump fit into slots diametrically inserted in the peripheral face of the driver. Fig. 5, letter D. Each blade as before stated is provided with a trunnion at either end. Fig. 6, letter U. Each trunnion carries a ring Fig. 10, letter V to compensate for the wear created by constant action or said trunnion may be constructed as in Figs. 8 and 9 so as to carry a compound ring letters W and X, or so as to carry a sectional bearing as shown on Figs. 6 and 7, letter Y. The blade has a recess on its inner edge, Fig. 6, letter Z which lightens its weight and takes care of any accumulation of sediment which might otherwise impede the movement of the blade.

In the preferred type of construction illustrated Figs. 1 and 2, letter AA is the casing, the same being supplied with an entrance orifice letter G, and a discharge orifice letter H and counter-bore letter C and by-pass ports letters J and K.

The interior periphery letter BB of the casing is a curve such as described and illustrated at letter BB, Fig. 1, excepting for the said by-pass opposite said orifice.

To effect the radial movement of the blades the groove in the side plates Fig. 1, letter N before mentioned is provided, said groove being necessarily stationary relative to the side plate as well as to the casing.

The driver Figs. 4 and 5 is provided with slots diametrically arranged corresponding to the number of blades to be utilized, one slot for each blade. The number of blades is not limited in my invention as the greater the number of blades used the greater the efficiency or capacity of the pump will be.

The driver may be either bored through at center from face to face to receive a shaft Fig. 5, letter CC or said shaft may be formed integral with the rotor on both faces thereof.

Trunnions are formed on either end of the blades of a length equal to the depth of the groove in the side plates Fig. 6, letter U.

The pump is operated either by means of a belt pulley or by means of a gear mounted upon a shaft by direct drive or other suitable means.

The operation of my invention may be understood from a reference to Fig. 1 the direction of the revolution of the driver being shown by arrows.

The eccentric mounting of the driver leaves a space of transverse sectional crescent shape between the driver and the casing, protruding into which space the several blades act as diaphragms, dividing said space into a plurality of chambers as shown on Fig. 1.

The position of the driver and blades being as shown in Fig. 1, the fluid is being discharged through the discharge orifice H; chamber DD is a carrying chamber; chamber EE is receiving a supply of fluid; and chamber FF is conveying a full charge of fluid toward discharge orifice H.

The chambers continually decrease in volume as they approach the discharge orifice, compression of the contained liquid takes place, and to relieve such compression a by-pass port is positioned, communicating with the discharge orifice and with the chambers at the point of revolution where said compression arises in said chambers.

By means of said by-pass the potential energy of compression is immediately converted into the kinetic energy of velocity of liquid at discharge orifice as shown on Fig. 1.

My invention may be constructed of any kind of alloy which is most adaptable to the conditions under which the pump is required to work, may be made of any size deemed advisable and convenient, and while I have illustrated and described a certain form of construction and arrangement of parts I wish to include in this application for Letters Patent all substitutes and mechanical equivalents that may come within the scope and purview of the particular invention as referred to in the claim hereinafter mentioned.

Having disclosed my invention so as the same may be constructed by those skilled in the art, what I claim is as follows:

A rotary pump such as described consisting of a casing substantially cylindrical in cross section having an inlet and outlet port therein; plates inclosing the sides of said casing; an annular groove formed in the inner face of each of said side plates concentric with the center of said casing; revoluble rings mounted in the grooves on the side walls thereof; a shaft revolubly mounted in said side plates eccentrically with the center of the casing; a rotor fixedly secured to said shaft within said casing and between said side plates; a plurality of slots formed within said rotor; a plurality of vanes slidably mounted in said slots in the rotor; projections on the ends of said vanes extending outwardly beyond the rotor; anti-friction rollers on said projections, said projections engaging the grooves formed in the side plates and controlling the outward movement of said vanes to approximately sealing contact with the inner periphery of the casing.

In witness whereof I claim the foregoing as my own, I hereunto affix my signature in the presence of two subscribing witnesses.

J. HUNTER SMITH.

Witnesses:
 CARL E. SINCLAIR,
 F. P. HOUD.